(12) United States Patent
How et al.

(10) Patent No.: US 9,960,903 B1
(45) Date of Patent: *May 1, 2018

(54) SYSTEMS AND METHODS FOR CLOCK ALIGNMENT USING PIPELINE STAGES

(71) Applicant: Altera Corporation, San Jose, CA (US)

(72) Inventors: Dana How, Palo Alto, CA (US); Carl Ebeling, Redwood City, CA (US); Audrey Catherine Kertesz, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/332,773

(22) Filed: Oct. 24, 2016

Related U.S. Application Data

(63) Continuation of application No. 14/974,506, filed on Dec. 18, 2015, now Pat. No. 9,501,092.

(51) Int. Cl.
*H04L 25/38* (2006.01)
*H04L 7/02* (2006.01)
*H04L 7/00* (2006.01)

(52) U.S. Cl.
CPC .............. *H04L 7/02* (2013.01); *H04L 7/0054* (2013.01)

(58) Field of Classification Search
CPC .................................. H04L 7/02; H04L 7/0054
USPC ............................................................ 375/371
See application file for complete search history.

(56) References Cited

U.S. PATENT DOCUMENTS

| | | | | |
|---|---|---|---|---|
| 5,610,543 A | * | 3/1997 | Chang | G11C 7/22 327/145 |
| 6,081,142 A | * | 6/2000 | Douchi | G11C 7/1051 327/158 |
| 7,697,647 B1 | * | 4/2010 | McShea | H03L 7/087 375/354 |
| 2003/0226000 A1 | * | 12/2003 | Rhoades | G06F 9/30181 712/218 |
| 2004/0030513 A1 | * | 2/2004 | Kocaman | H03L 7/091 702/79 |
| 2009/0256610 A1 | * | 10/2009 | Yoon | H03L 7/087 327/254 |
| 2009/0322398 A1 | * | 12/2009 | To | G06F 1/10 327/292 |
| 2010/0079184 A1 | * | 4/2010 | Bowman | H03K 3/0375 327/225 |
| 2015/0123582 A1 | * | 5/2015 | Gu | H02P 6/182 318/400.35 |

* cited by examiner

*Primary Examiner* — Helene Tayong
(74) *Attorney, Agent, or Firm* — Fletcher Yoder, P.C.

(57) ABSTRACT

Systems and methods for phase detection are disclosed. Phase alignment between first and second clock signals is detected using a comparison of outputs from a collapsible pipeline and a non-collapsible pipeline.

17 Claims, 11 Drawing Sheets

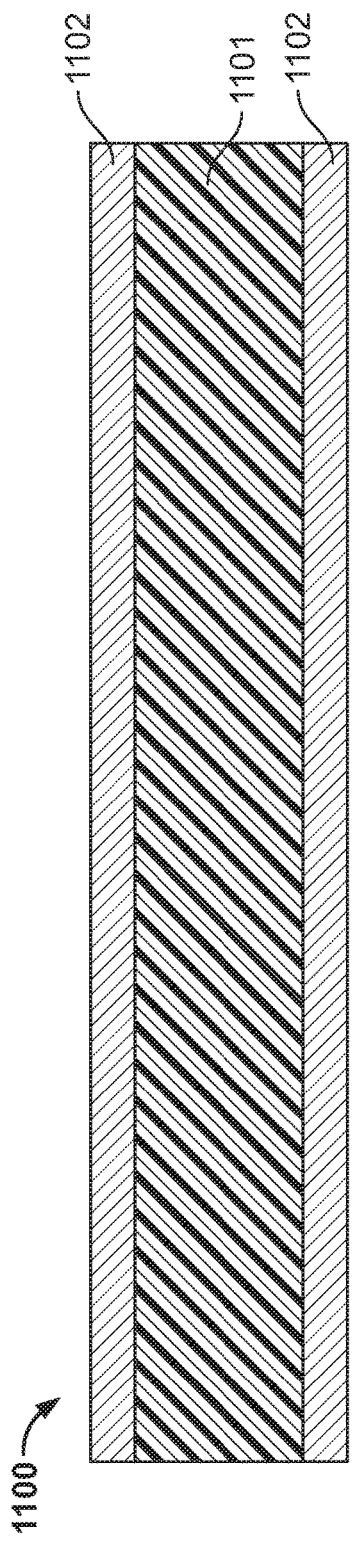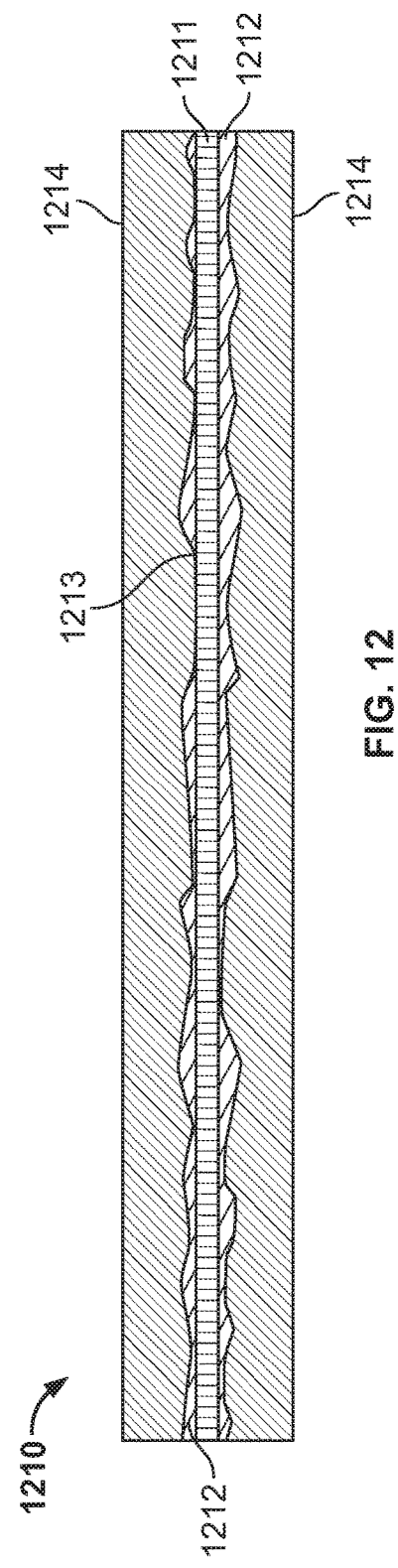

SYSTEMS AND METHODS FOR CLOCK ALIGNMENT USING PIPELINE STAGES

CROSS-REFERENCE TO RELATED APPLICATIONS

This application is a continuation of Ser. No. 14/974,506, filed Dec. 18, 2015, entitled "Systems and Methods for Clock Alignment Using Pipeline Stages," the disclosure of which is hereby incorporated by reference herein in its entirety.

BACKGROUND OF THE INVENTION

It is generally desirable to create integrated circuits that have clock signals that are aligned with each other to maintain synchrony across various components on the circuit. Often, systems may use multiple clock signals that have frequencies that are related to one another. For example, a system may use a first clock signal at a first frequency and a second clock signal at a second frequency that is an integer multiple (e.g., 2×, 3×, 4×, or any other suitable number) of the first frequency.

A phase detector or a phase frequency detector may be used in a phase locked loop (PLL), and may be used to measure a difference in phase between two input signals. These require careful design and control of their physical implementation. Often, a PLL is placed on a separate chip from other components. The signals to and from the PLL often have to travel a long distance, and variation along the signal path causes increased loss of the useful portion of the clock cycle.

Moreover, field-programmable gate arrays (FPGAs) sometimes have limited clock generation options, and clock signals in an FPGA sometimes require being routed a long distance on the integrated circuit before being distributed to the subsystem that makes use of the clock signals. This long distance causes and exacerbates an uncertainty between related clock signals when they arrive at the subsystem. This effectively reduces the remaining useful clock period.

SUMMARY OF THE DISCLOSURE

This disclosure relates to integrated circuit devices, and particularly to such devices having multiple clock signals.

In accordance with implementations of the present invention, systems and methods for configuring a phase detector. The phase detector includes a first register, a second register, and a third register. The first register is in a first stage having a first clock signal having first clock edges. The second register is in a second stage and receives a first signal from the first stage, and has a second clock signal having second clock edges. The third register is in a third stage that receives a second signal from the second stage, and has a third clock signal having third clock edges. Each second clock edge has a corresponding first clock edge and a corresponding third clock edge.

In some implementations, the first clock signal, the second clock signal, and the third clock signal have the same frequency. The second clock signal may have a set of missing second clock edges, such that there are more first clock edges than second clock edges, and more third clock edges than second clock edges. In this case, the set of missing second clock edges causes the first, second, and third stages to resemble a pipeline of more than three stages at times corresponding to the set of missing second clock edges. The first, second, and third stages resemble a pipeline of three stages only when the first clock signal, the second clock signal, and the third clock signal are substantially aligned with one another.

In some implementations, the first, second, and third stages resemble a pipeline of two stages when the first or third clock signal is misaligned with the second clock signal. In particular, when the third clock signal has a positive phase delay with respect to the second clock signal, the second stage and the third stage may collapse to resemble a single stage. When the second clock signal has a positive phase delay with respect to the first clock signal, the first stage and the second stage may collapse to resemble a single stage.

In some implementations, the first clock signal and the third clock signal have the same frequency, and the second clock signal has a frequency that is less than the frequency of the first clock signal and the third clock signal.

In some implementations, the phase detector further includes a two-stage pipeline that includes a fourth register and a fifth register. The first stage, the second stage, and the third stage is a collapsible three-stage pipeline. The first clock signal and the third clock signal are the same clock signal, and the fourth register and the fifth register have the same clock signal as the first clock signal and the third clock signal. The phase detector may further include a counter that provides an input signal into the collapsible three-stage pipeline and the two-stage pipeline. The phase detector may further include a comparator that compares a first output of the collapsible three-stage pipeline and a second output of the two-stage pipeline to determine whether collapse has occurred in the collapsible three-stage pipeline.

In some implementations, the phase detector comprises a collapsible three-stage pipeline including first, second, and third stages, a two-stage pipeline including fourth and fifth stages, a counter that provides an input signal into the collapsible three-stage pipeline and the two-stage pipeline, and a comparator that compares a first output of the collapsible three-stage pipeline and a second output of the two-stage pipeline. The first, third, fourth, and fifth stage may have a same first clock signal having first clock edges, while the second stage may have a second clock signal having second clock edges, and each second clock edge has a corresponding first clock edge. The comparator may determine whether the first clock signal is substantially aligned with the second clock signal. In some implementations, a frequency of the first clock signal is n times a frequency of the second clock signal.

BRIEF DESCRIPTION OF THE DRAWINGS

Further features of the disclosed techniques, their nature and various advantages, will be apparent upon consideration of the following detailed description, taken in conjunction with the accompanying drawings, in which like reference characters refer to like parts throughout, and in which:

FIG. 11 shows a cross section of a magnetic data storage medium which can be encoded with a machine executable program that can be carried out by systems of the present disclosure, in accordance with an implementation; and FIG. 12 shows a cross section of an optically-readable data storage medium which can be encoded with a machine executable program, which can be carried out by systems of the present disclosure, in accordance with an implementation.

DETAILED DESCRIPTION

Figure 1:
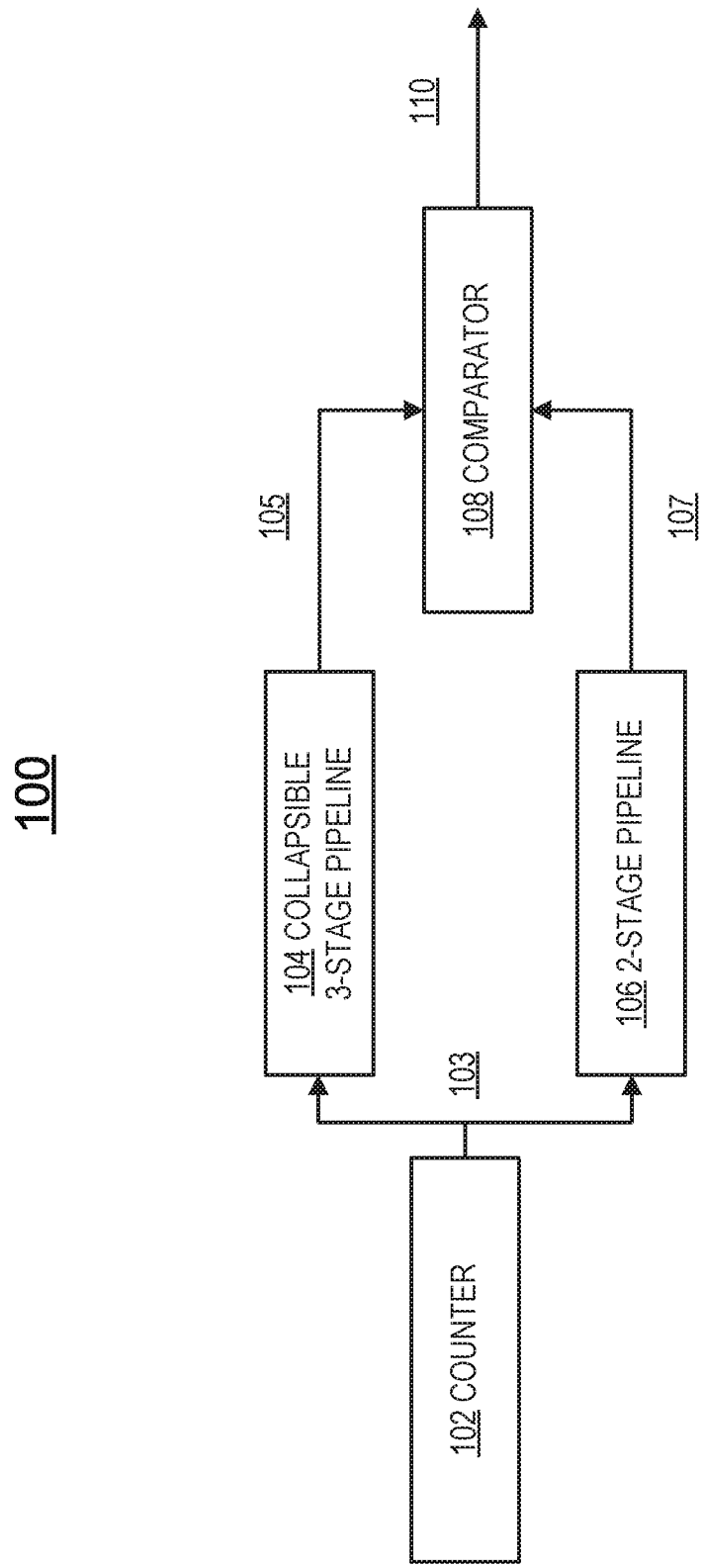
FIG. 1 shows an illustrative block diagram of a phase detector, in accordance with an implementation.

The systems and methods of the present invention include a circuit for clock alignment on an integrated circuit. In an ASIC or ASSP, a generation circuit may be used to create various clock signals, which may be distributed locally. However, on an FPGA, clock generation is limited because clocks have to be distributed very precisely, and specific resources may be needed to perform the distribution. Moreover, an FPGA is configurable, such that the clocks to be used in an FPGA may also need to be configurable. However, as clocks become configurable, they may degrade.

In one example, clock sources may be required to originate at a small number of locations on the integrated circuit. This does not provide much flexibility to provide the clock signal into the portion of the circuit that uses the clock signal. Accordingly, in an FPGA, it is more likely that clock signals will be routed over a long distance before they are actually used in the circuit elements (such as flip flops, for example). As a clock signal travels over a long distance, distortion results due to various error components, such as power-supply noise or mismatch, which may be partially correlated with one another.

One result of the distortion is dispersion in the distribution of the edge timings, thereby causing uncertainty in the clock edges. The longer the distance that the clock signal travels, the less certain one can be about the precision of the edges. In another example, power-supply induced jitter results when local power connections are noisy and do not have the same power noise, which causes further dispersion. Different clock signals may experience different power-supply induced jitter, giving rise to even greater dispersion. Dispersion causes the length of the useful clock period to decrease, which is generally undesirable.

A subsystem may use multiple clock signals that have frequencies that are related to one another. Clock signals in an FPGA sometimes require being routed a long distance on the integrated circuit before being distributed to the subsystem that makes use of the clock signals. This long distance causes and exacerbates an uncertainty between related clock signals when they arrive at the subsystem. This effectively reduces the remaining useful clock period.

The present disclosure describes a measurement scheme that may be inserted directly into a subsystem, that allows the source phases of the related clock signals to be adjusted, such that the uncertainty described above is nulled or reduced. The measurement scheme includes pipelines that may be implemented in any synchronous design that supports an FPGA. In particular, the systems and methods of the present disclosure include two clock signals—one "fast" clock and one "slow" clock. While two clock signals are referred to herein as a fast clock and a slow clock, the frequencies of the two clock signals may be the same. However, the slow clock may be allowed to be missing one or more clock edges. Alternatively, the fast clock may have a frequency that is an integer multiple of the frequency of the slow clock. As long as each edge of the slow clock has a corresponding edge of the fast clock, the measurement scheme described herein will effectively operate to detect clock alignment. This is why the slow clock may have the same frequency as the fast clock, but is also allowed to have missing clock edges. Moreover, this is also why the fast clock is allowed to have a frequency that is an integer multiple of the frequency of the slow clock. The measurement scheme includes a system that operates mostly in the "fast" domain, and includes a first pipeline, a second pipeline, a counter, and a comparator.

The output of the measurement scheme may be fed into a feedback loop so that the source of the clock signal may be delayed appropriately. A phase frequency detector is capable of continuously monitoring a phase difference between two signals, and may provide a feedback signal to continuously adjust the phase of the source signals. In contrast, the measurement scheme described herein may be used to align a slow clock and a fast clock before the integrated circuit is used. In particular, the measurement scheme may be used to correct for built-in, long-term, and/or static properties, but the measurement scheme described herein may not be capable of correcting for slow changes in voltage or other kinds of drifts such as temperature drift. Moreover, the measurement scheme described herein may not be capable of correcting for cycle-to-cycle jitter.

FIG. 1 depicts an illustrative block diagram 100 of a detector, in accordance with an implementation. The block diagram 100 depicts a counter 102, a collapsible three-stage pipeline 104, a two-stage pipeline 106, and a comparator 108. The counter 102 keeps track of and increments a number 103, which is provided to both the collapsible three-stage pipeline 104 and the two-stage pipeline 106. The two-stage pipeline 106 may include two registers having the same clock. Accordingly, the result of the two-stage pipeline 106 is simply a delay of the input signal 103 for two cycles.

The collapsible three-stage pipeline 104 resembles three stages (e.g., a delay of the input signal 103 for three cycles) in some operating conditions, and resembles two stages (e.g., a delay of the input signal 103 for two cycles) in other operating conditions. One example implementation of the collapsible three-stage pipeline 104 is described in detail in relation to FIG. 2. More specifically, the middle stage of the collapsible three-stage pipeline 104 has a slower clock than the faster clock used for the first and last stages of the collapsible three-stage pipeline 104. When the slower clock and the faster clock are in alignment, the collapsible three-stage pipeline 104 resembles three stages. Otherwise, when the slower clock and the faster clock are not in alignment, the collapsible three-stage pipeline 104 resembles two stages.

The comparator 108 compares the output signal 105 of the collapsible three-stage pipeline 104 to the output signal 107 of the two-stage pipeline 106, and determines whether the output signals 105 and 107 are the same. If the output signals 105 and 107 are the same, this implies that the collapsible three-stage pipeline 104 has collapsed to resemble two stages, and the slower clock and the faster clock are not aligned. Alternatively, if the output signals 105 and 107 are different, this implies that the collapsible three-stage pipeline 104 has not collapsed and resembles three stages. This serves as an indication that the slower clock and the faster clock are aligned. In this manner, the comparator 108 provides an output signal 110 that indicates whether the slower clock and the faster clock are aligned. When the output signal 110 of the comparator 108 indicates that the clocks are not aligned, a feedback signal may be transmitted to the source of one or both of the clock signals. The feedback may include an instruction to delay one or both clock signals by a particular amount.

While a collapsible three-stage pipeline 104 and a two-stage pipeline 106 is shown in FIG. 1, one of ordinary skill in the art will understand that any number of stages for a pipeline may be used to detect whether clocks are aligned, without departing the scope of the present disclosure.

Figure 2:
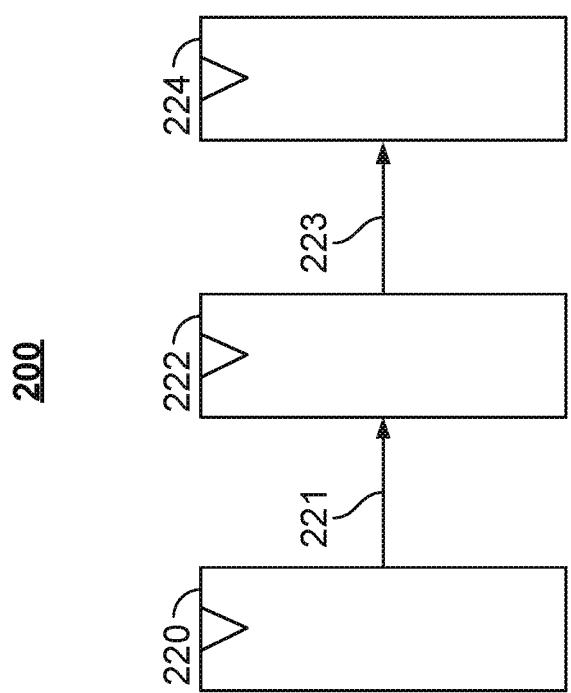
FIG. 2 shows an illustrative block diagram of a collapsible three-stage pipeline, in accordance with an implementation.

FIG. 2 depicts an illustrative block diagram 200 of a collapsible three stage pipeline (e.g., 104), in accordance with an implementation. The block diagram 200 depicts a first stage 220, a second stage 222, and a third stage 224. Each stage in FIG. 2 is shown as being implemented by a register, which will effectively delay a received signal until the next rising edge of a clock is detected. The first stage 220 and the third stage 224 may use an identical clock signal, which may be referred to herein as a fast clock. The second stage 222 may use a clock signal that is different from that used by the first stage 220 and the third stage 224. The clock signal used by the second stage 222 may be referred to herein as a slow clock. Each stage 220, 222, and 224 is implemented by a register, which receives a data input and a clock input. The register latches at a rising edge of the clock input.

In some implementations, the frequency of the fast clock is an integer multiple of the frequency of the slow clock (e.g., 2×, 3×, 4×, or any other suitable integer multiple). In this case, the second stage 222 may delay its received signal 221 until the next rising clock edge is detected, which would take N fast clock periods (if the fast clock has a frequency that is N times the frequency of the slow clock). Accordingly, when the slow clock and the fast clock are aligned, the three-stage pipeline of FIG. 2 resembles an N+2 stage pipeline, where N is an integer greater than zero. In a similar manner, the slow clock may miss one or more edges. In this case, the three-stage pipeline of FIG. 2 resembles a pipeline with at least three stages (e.g., three stages when the slow clock does not have any missing edges, and 3+M stages when the slow clock has M missing edges in sequence).

In other implementations, the frequency of the fast clock is the same as the frequency of the slow clock. As discussed above, the slow clock may also be allowed to have missing clock edges. In either case (e.g., whether the frequency of the fast clock is higher than or the same as the frequency of the slow clock), each edge of the slow clock has a corresponding edge of the fast clock. However, the converse is not necessarily true (each edge of the fast clock may not have a corresponding edge of the slow clock).

The arrangement of the three stages 220, 222, and 224 in series forms a three-stage pipeline that resembles a two-stage pipeline when the fast clock and the slow clock have the same frequencies but are not synchronized with each other. Alternatively, when the fast clock and the slow clock have the same frequencies and are synchronized with each other (e.g., when each rising edge of the slow clock is synchronized with a rising edge of the fast clock), then the three-stage pipeline resembles a three-stage pipeline when the fast and slow clocks have the same frequencies.

Figure 3:
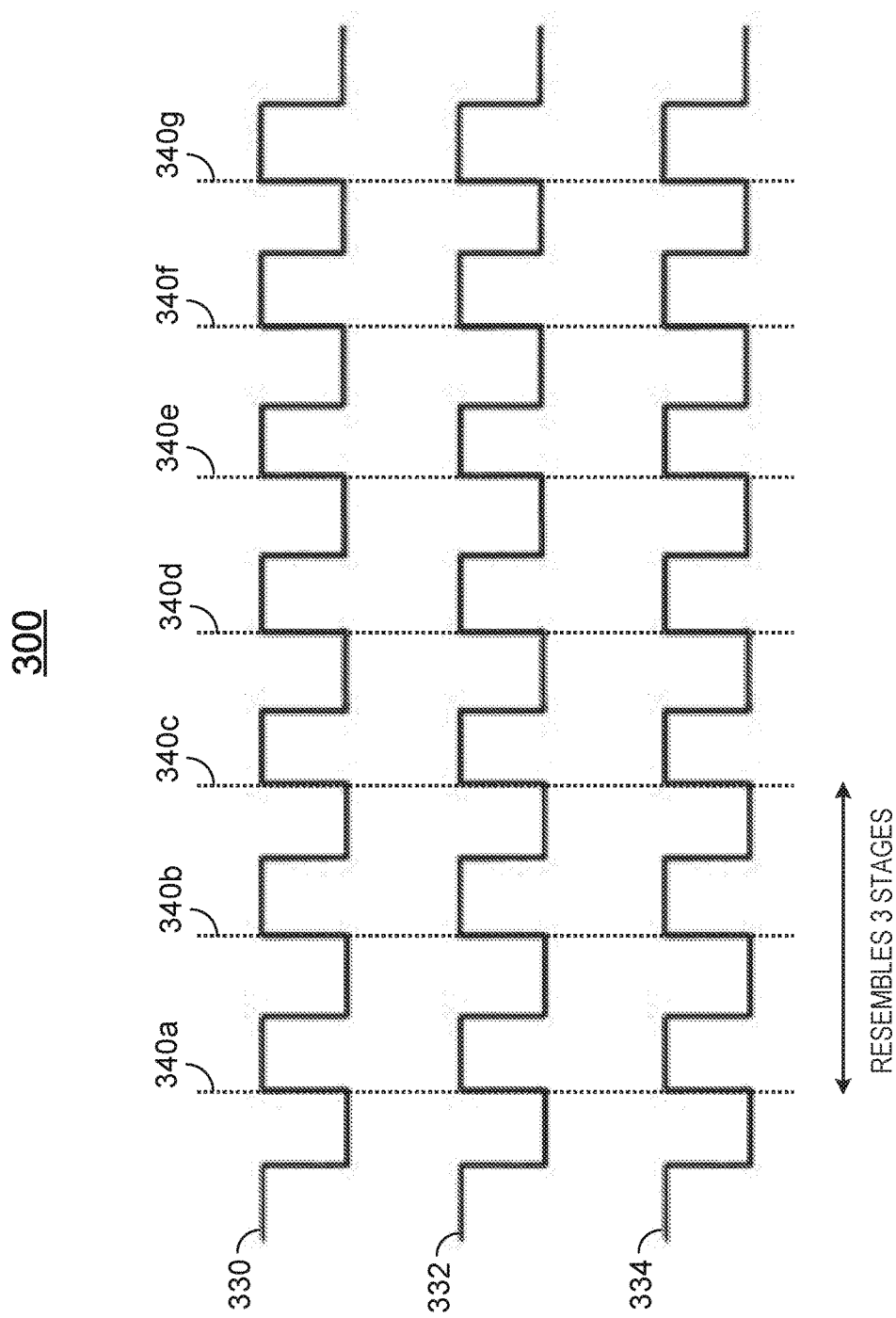
FIG. 3 shows an illustrative graph of three clock signals of a collapsible three-stage pipeline, when a slow clock is aligned with a fast clock, according to an illustrative implementation.
Figure 4:
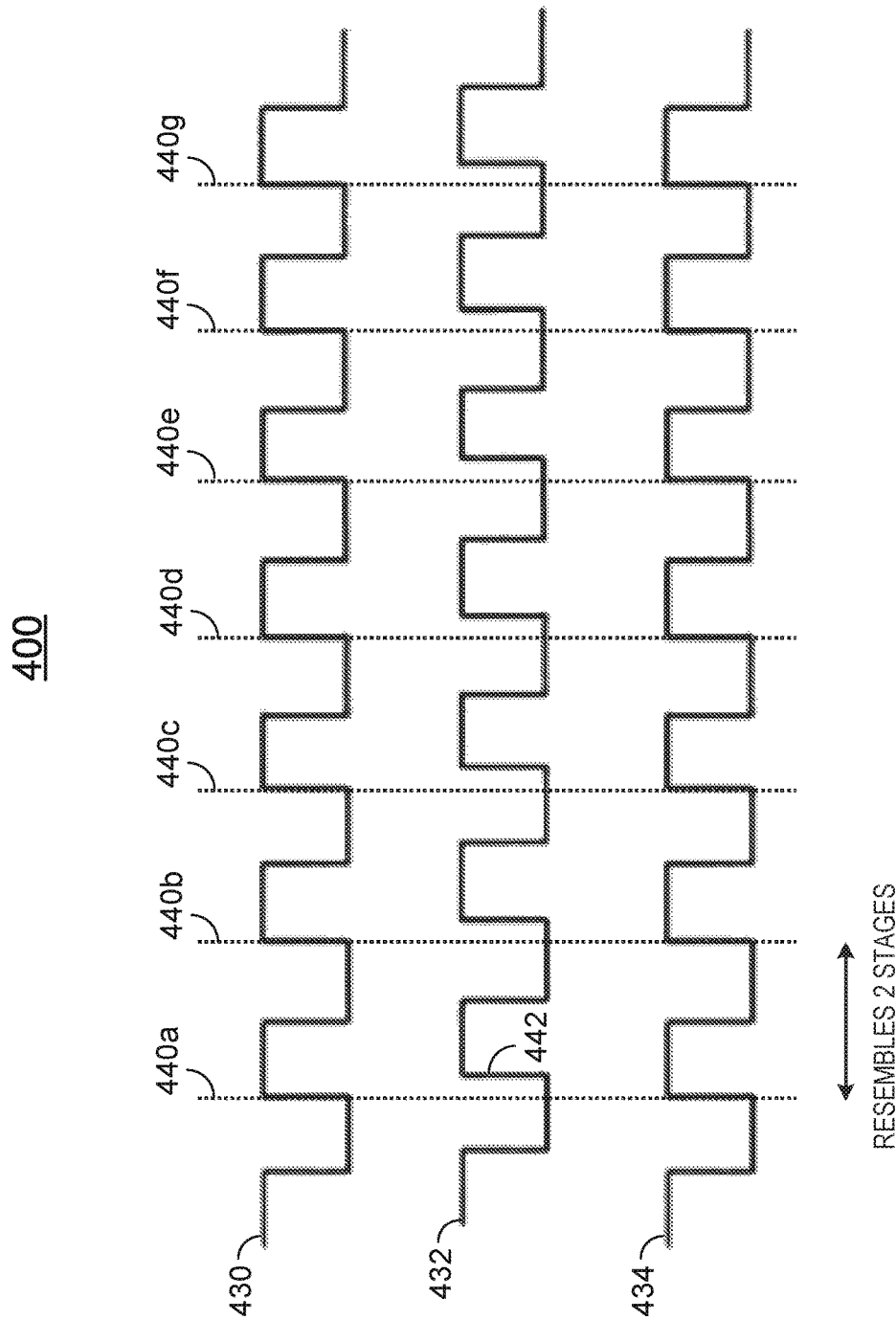
FIG. 4 shows an illustrative graph of three clock signals of a collapsible three-stage pipeline, when a slow clock is delayed with respect to a fast clock, according to an illustrative implementation.
Figure 5:
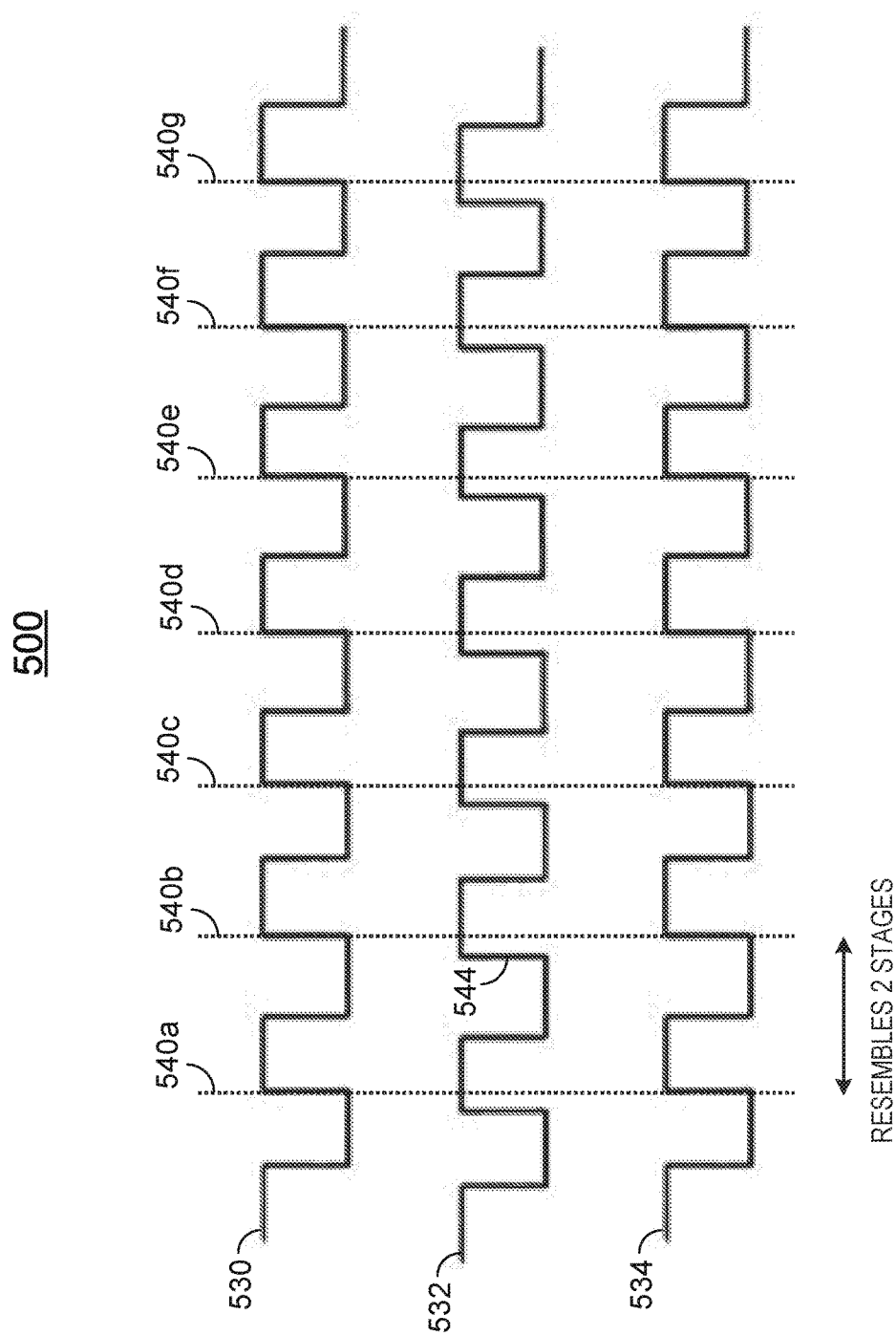
FIG. 5 shows an illustrative graph of three clock signals of a collapsible three-stage pipeline, when a fast clock is delayed with respect to a slow clock, in accordance with an implementation.

In one example, when the frequency of the fast clock is N times the frequency of the slow clock, the three-stage pipeline shown in FIG. 2 may resemble an N+2-stage pipeline. FIGS. 3-5 depict graphs of the three clock signals of a collapsible three-stage pipeline, when the slow clock has the same frequency as the fast clock, and the slow clock does not have any missing edges. However, as is described herein, when the slow clock misses edges, the collapsible three-stage pipeline of FIG. 2 sometimes resembles a pipeline that has a depth larger than 3. In general, even if the slow clock is missing one or more edges, the collapsible three-stage pipeline may not resemble a pipeline of depth two (e.g., a two-stage pipeline) when the clocks are aligned.

One advantage of the arrangement of the three stages 220, 222, and 224 shown in FIG. 2 is that no special components need to be used to implement the collapsible three-stage pipeline. Unusual components sometimes have certain requirements or require special circuitry. Accordingly, if unusual components were required to implement a collapsible pipeline, there would be less flexibility for positioning than the pipeline of FIG. 2. The systems and methods of the present disclosure have an advantage over existing phase detectors at least because the pipeline of FIG. 2 is flexible and may be placed in any location on an integrated circuit. In contrast, phase detectors have specific specialized components that may only be used for detecting a phase offset. Because only standard components are used by the detector described herein, the collapsible three-stage pipeline of FIG. 2 may be positioned at essentially any location on an integrated circuit. In this manner, the pipeline of FIG. 2 is capable of measuring a phase difference at any location, particularly in the center of a location where the phase difference matters.

FIG. 3 depicts a graph of the three clock signals of a collapsible three-stage pipeline, when the slow clock is aligned with the fast clock. The clock signal 330 corresponds to the clock of the first stage 220 (e.g., the fast clock), the clock signal 332 corresponds to the clock of the second stage 222 (e.g., the slow clock), and the clock signal 334 corresponds to the clock of the third stage 224 (e.g., the fast clock). As is shown in FIG. 3, all three clock signals 330, 332, and 334 have the same frequency, and none of the edges of the clock signal 332 are missing. The time instances 340a-g indicate the rising edges of the fast clock signal 330 and 334. When the clock signals 330, 332, and 334 are aligned, the registers 222 and 224 latch at the next rising edge of the clock. Accordingly, the delay from the first stage 220 to the third stage 224 corresponds to two full clock cycles, and the collapsible three-stage pipeline resembles three stages.

FIG. 4 depicts a graph of the three clock signals of a collapsible three-stage pipeline, when the slow clock is delayed with respect to the fast clock. The clock signal 430 corresponds to the clock of the first stage 220 (e.g., the fast clock), the clock signal 432 corresponds to the clock of the second stage 222 (e.g., the slow clock), and the clock signal 434 corresponds to the clock of the third stage 224 (e.g., the fast clock). As is shown in FIG. 4, all three clock signals 430, 432, and 434 have the same frequency, and none of the edges of the clock signal 432 are missing. The time instances 440a-g indicate the rising edges of the fast clock signal 430 and 434. The first stage 220 latches at rising edge 440a. Because the slow clock signal 432 is slightly delayed with respect to the fast clock signals 430 and 434, the second stage 222 latches at the rising clock edge 442. This causes the first stage 220 and the second stage 222 to effectively collapse into a single stage, and the third stage 224 latches at the rising clock edge 440b. Accordingly, the delay from the first stage 220 to the third stage 224 corresponds to only one full clock cycle, and the collapsible three-stage pipeline resembles two stages. In this manner, the collapsible three-stage pipeline is said to have collapsed into two stages. Moreover, because the rising clock edges 440a and 442 are so close to each other, this implies that the first stage 220 and the second stage 222 latch at essentially the same time. In this case, the first stage 220 and the second stage 222 essentially collapse into one stage.

FIG. 5 depicts a graph of the three clock signals of a collapsible three-stage pipeline, when the fast clock is delayed with respect to the slow clock. The clock signal 530 corresponds to the clock of the first stage 220 (e.g., the fast clock), the clock signal 532 corresponds to the clock of the second stage 222 (e.g., the slow clock), and the clock signal 534 corresponds to the clock of the third stage 224 (e.g., the fast clock). As is shown in FIG. 5, all three clock signals 530, 532, and 534 have the same frequency, and none of the edges of the clock signal 532 are missing. The time instances 540a-g indicate the rising edges of the fast clock signal 530 and 534. The first stage 220 latches at rising edge 540a. Because the slow clock signal 532 is slightly early with respect to the fast clock signals 530 and 534, the second stage 222 latches at the rising clock edge 544. This causes the third stage 224 to latch at the rising clock edge 540b, such that the second stage 222 and the third stage 224 effectively collapse into a single stage. Accordingly, the delay from the first stage 220 to the third stage 224 corresponds to only one full clock cycle, and the collapsible three-stage pipeline resembles two stages. In this manner, the collapsible three-stage pipeline is said to have collapsed into two stages. Moreover, because the rising clock edges 542 and 540b are so close to each other, this implies that the second stage 222 and the third stage 224 latch at essentially the same time. In this case, the second stage 222 and the third stage 224 essentially collapse into one stage.

In some implementations, the slow clock signal misses some edges. However, every slow clock edge has a corresponding edge of the fast clock. For each of the slow clock edges that exist and its corresponding fast clock edge, the three-stage pipeline should resemble a three-stage pipeline when the clocks are aligned, and a two-stage pipeline when the clocks are misaligned. For the remaining fast clock edges that have no corresponding slow clock edge, the three-stage pipeline will resemble a pipeline having 3 or more stages. Accordingly, even when the slow clock has missing edges, the collapsible three-stage pipeline described herein is capable of detecting whether the two clock signals are aligned.

While FIGS. 3-5 depict diagrams of the clock signals when the frequency of the slow clock matches the frequency of the fast clock, one of ordinary skill in the art will appreciate that a similar collapse or no collapse effect can take place when the frequency of the fast clock is an integer multiple of the slow clock frequency. For example, if the slow clock is 2× slower than the fast clock, and the clocks are in alignment, the collapsible three-stage pipeline resembles 3 or 4 stages. If the slow clock is 2× slower and the slow clock is misaligned with the fast clock (e.g., the slow clock is early or late), the collapsible three stage pipeline resembles 2 or 3 stages. In this case, the collapsible three-stage pipeline may again be compared to a two-stage pipeline to determine whether collapse has occurred.

Figure 6:
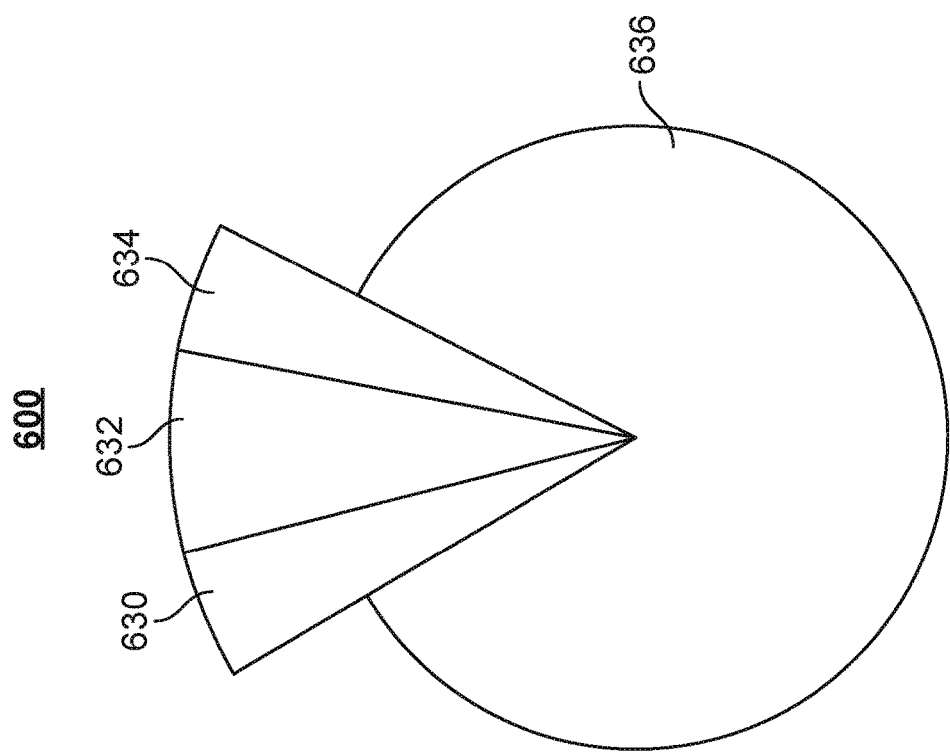
FIG. 6 shows an illustrative polar diagram that illustrates an amount of delay that is exhibited by a collapsible three-stage pipeline, as a function of a phase difference between a fast clock and a slow clock, in accordance with an implementation.

FIG. 6 is a polar diagram 600 that illustrates an amount of delay that is exhibited by a collapsible three-stage pipeline. The radius of the polar diagram 600 is indicative of the latency of the collapsible three-stage pipeline. In particular, the radius of region 636 corresponds to a latency of a two-stage pipeline, and the radius of regions 630, 632, and 634 corresponds to a latency of a three-stage pipeline. The positive vertical axis of diagram 600 (corresponding to the center point of the region 632) corresponds to the fast clock and the slow clock being aligned. The angle, with respect to the vertical axis, is a number of degrees that corresponds to a phase delay between the two clock signals.

Accordingly, when the slow clock and the fast clock are aligned with each other, there is no clock skew and the angle with respect to the vertical axis is zero degrees. In this case, the latency of the collapsible three-stage pipeline is 3 clock cycles. The regions 630, 632, and 634 correspond to tolerable amounts of phase delays, for which the latency of the collapsible three-stage pipeline is 3 clock cycles, as was explained in relation to FIG. 3. Outside of these three regions, the latency of the collapsible three-stage pipeline is 2 clock cycles because two of the three stages have collapsed into a single stage, as was explained in relation to FIGS. 4 and 5.

The region 632 represents the effects of different intrinsic delays on the collapsible three-stage pipeline. In other words, the width of the region 632 corresponds to an amount of tolerable phase difference where the collapsible three-stage pipeline resembles a three-stage pipeline. The right portion of the region 632 corresponds to a tolerable amount of phase difference due to the clock-to-out delay (Tco) of the second stage 222 but diminished by the hold time (Th) of the third stage 224. In other words, the three-stage collapsible pipeline may be configured to tolerate a delay of the fast clock by up to TCO2−TH3, where TCO2 corresponds to the clock to out time of the second stage 222, and TH3 corresponds to the hold time of the third stage 224.

Similarly, the left portion of the region 632 corresponds to a tolerable phase difference due to the clock-to-out delay (Tco) of the first stage 220 but diminished by the hold time (Th) of the second stage 222. Therefore, the three-stage collapsible pipeline may be configured to tolerate a delay of the slow clock by up to TCO1−TH2, where TCO1 corresponds to the clock to out time of the first stage 220, and TH2 corresponds to the hold time of the second stage 222.

Accordingly, the collapsible three-stage pipeline provides an intrinsic operating window corresponding to the region 632. This intrinsic operating window represents an amount of tolerable phase difference between the fast clock and the slow clock based on the clock to out times and the hold times of the three stages. In some implementations, the clock to out times (TCO) and the hold times (TH) of all three stages 220, 222, and 224 are the same, such that the region 632 is symmetric about the vertical axis, and the width of the region 632 corresponds to 2*(TCO−TH).

The regions 630 and 634 correspond to amounts of delays between adjacent stages in the collapsible three-stage pipeline. In particular, the region 330 corresponds to an amount of delay between the first stage 220 and the second stage 222, and the region 334 corresponds to an amount of delay between the second stage 222 and the third stage 224. For example, as the delay between the first stage 220 and the second stage 222 increases, this means that a larger phase difference between the fast and slow clocks is tolerable (e.g., the collapsible three-stage pipeline still resembles 3 stages). Similarly, as the delay between the second stage 222 and the third stage 224 increases, this means that a larger phase difference between the slow and fast clocks is tolerable (e.g., the collapsible three-stage pipeline still resembles 3 stages).

In some implementations, it is desirable for a measurement error to be centered around zero. In that case, it may be desirable for the delay between the first stage 220 and the second stage 222 to be matched to the delay between the second stage 222 and the third stage 224. In this case, the regions 630, 632, and 634 are centered about the vertical axis.

As shown in FIG. 6, measurement of a phase delay that falls within the regions 630, 632, and 634 corresponds to a latency of 3 stages, indicating that the fast and slow clocks are aligned. In contrast, measurement of a phase delay that falls within the region 636 corresponds to a latency of 2 stages, indicating that two of the three stages in the collapsible three-stage pipeline have collapsed into a single stage. In this case, a latency of 2 stages indicates that the fast and slow clocks are not aligned. As feedback is provided from the comparator 108 to the source(s) of the fast and slow clocks, the source may be instructed to adjust a delay of the fast clock and/or the slow clock in order to undo the detected phase offset.

In some implementations, the adjustment may correspond to a fixed amount that corresponds to a number of degrees less than the sum of the angles corresponding to the regions 630, 632, and 634. This way, the adjustment may traverse the outer perimeter of the polar diagram 300 until 3 stages are detected (e.g., by landing within one of the regions 630, 632, or 634).

Figure 7:
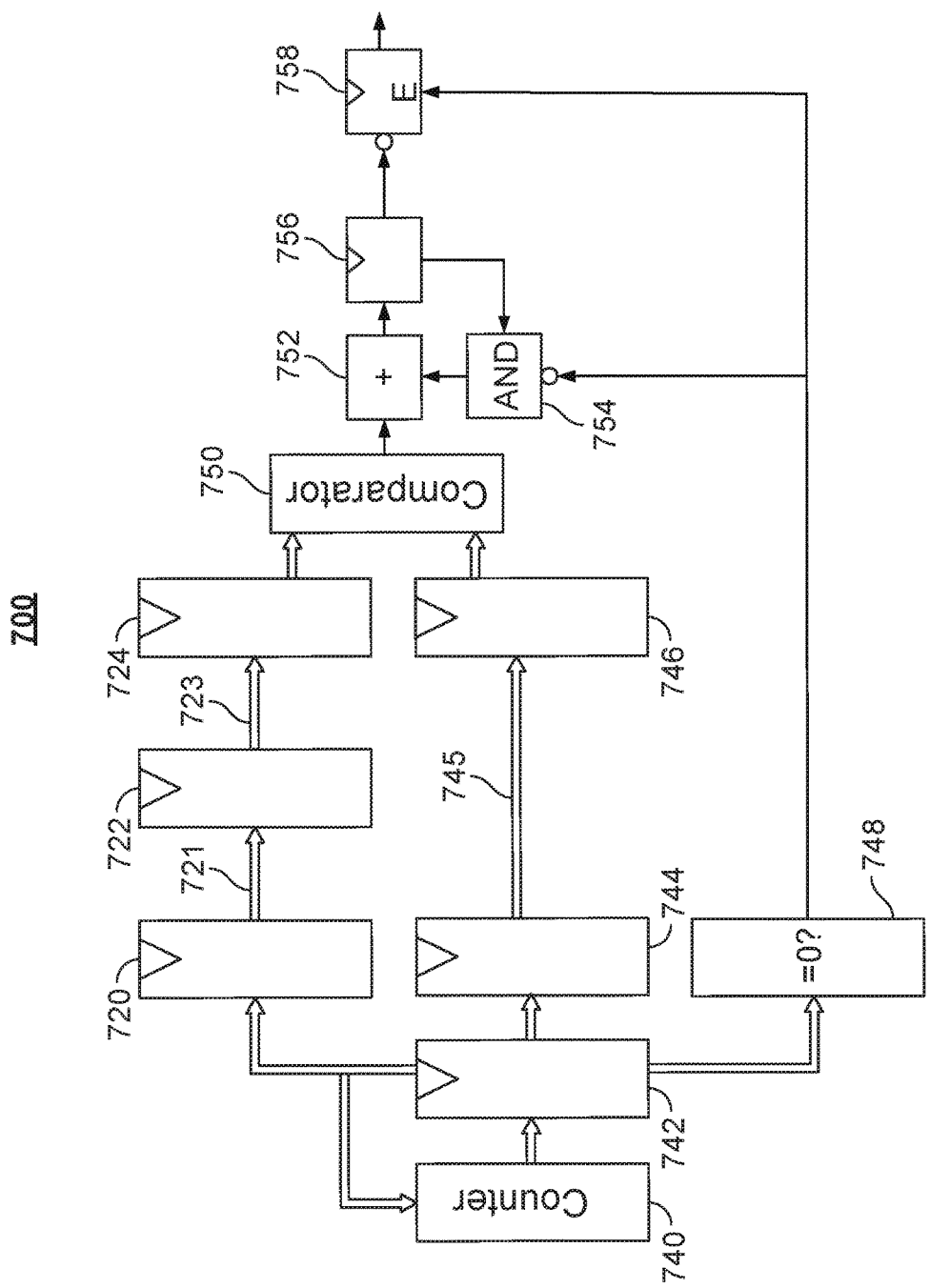
FIG. 7 shows a detailed illustrative block diagram of a phase detector, in accordance with an implementation.

FIG. 7 depicts an illustrative block diagram 700 of a detector, in accordance with an implementation. The block diagram 700 depicts a counter 740, a three stage pipeline including three registers 720, 722, and 724, a two stage pipeline including two registers 744 and 746, a zero detector 748, an input register 742, and a comparator 750. Unless otherwise specified, all of the components in FIG. 7 are clocked with the same clock signal (e.g., the "fast" clock signal).

In some implementations, each of the registers shown in FIG. 7 are B+1 bits wide. In an example, when B is one, the registers are each two bits wide. In this case, the counter 740 repeatedly cycles through 0, 1, 2, and 3 at a clock cycle corresponding to the fast clock. The output of the counter 740 is provided to an input register 742, which may be an optional component of the detector shown in FIG. 7. The registers 720, 722, and 724 make up a collapsible three-stage pipeline similar to the collapsible three-stage pipeline 104 of FIG. 1 and the pipeline shown and described in relation to FIG. 2. In particular, the registers 720 and 724 may be clocked with the fast clock signal, while the register 722 may be clocked with a slow clock signal.

Similarly, the registers 744 and 746 make up a two-stage pipeline similar to the two-stage pipeline 106 of FIG. 1. The delays of the paths 721 and 723 may be similar, since any discrepancy between the delays of the paths 721 and 723 will contribute to the measurement error of the collapsible three-stage pipeline previously discussed. The outputs of the collapsible three-stage pipeline and the two-stage pipeline are provided to the comparator 750, which compares these outputs and provides a one if the output signals are the same, and a zero if the output signals are different. As was described above, when the output signals are the same, this indicates that the collapsible three-stage pipeline resembles a two-stage pipeline, and that collapse has occurred. A collapse indicates that the fast and slow clock signals are not aligned. Otherwise, if the output signals are different, this implies that collapse has not occurred and that the fast and slow clock are aligned.

The zero detector 748 provides a one when a zero is detected, and zero otherwise. Accordingly, the zero detector 748 will repeatedly cycle through 1, 0, 0, and 0. As is shown in FIG. 7, the zero detector 748 provides its output signal to the AND gate 754 and as an enable signal to the register 758. If no collapse occurs in four cycles, this implies that the fast clock and the slow clock are aligned. Initially, when the counter 740 starts with 0, the zero detector 748 outputs 1. The output of the zero detector 748 is inverted to zero before being provided to the AND gate 754, thereby suppressing the output of the AND gate 754 to 0. The result of the suppressing the output of the AND gate 754 is that the previous value of the accumulator 752, which is stored in the register 756, is suppressed or ignored.

During the later cycles, when the counter 740 provides 1, 2, or 3, the zero detector 748 outputs 0, which is then inverted to 1 before being provided to the AND gate 754. The accumulator 752 (which may be implemented as an OR gate) receives input from the comparator 750 and from the AND gate 754. During the next cycle (e.g., when the counter 740 provides 1), the previous value from the comparator 750 is stored in the register 756 and is OR'd with the current value from the comparator 750 to obtain an updated accumulator output. Moreover, when the counter 740 provides 2, the accumulator output is stored in the register 756, and is again OR'd with the current value from the comparator 750. In this manner, over the next 3 cycles (when the counter 740 provides 1, 2, and 3), the accumulator 752 effectively computes the OR of the four values of the comparator 750 in sequence.

The output of the final register 758 is an "OK" signal that indicates whether collapse occurred at any time during the last four cycles. If the result (e.g., the output of the register 756) is 0, this means that the outputs of the collapsible three-stage pipeline and the two-stage pipeline were always different and that collapse has never occurred. This value is therefore inverted before being provided to the final register 758, which is only enabled (or latches) once every four cycles, when the counter 740 provides 0. However, if the result (e.g., the output of the register 756) is not zero, this means that the outputs of the collapsible three-stage pipeline and the two-stage pipeline were the same at least once during the four cycles, and that collapse occurred at least once during the four cycles. Then, inverting the output of the register 756 causes the register 758 to store a zero signal, indicating that the fast clock and slow clock are misaligned. In this manner, the register 758 provides an "OK" signal (1) or a "NOT OK" signal (0). An OK signal indicates that collapse has not occurred (e.g., the circuit is operating within one of the regions 630, 632, and 634 of FIG. 6). In contrast, a NOT OK signal indicates that collapse has occurred (e.g., the circuit is operating within the region 636 of FIG. 6).

While FIG. 7 has been described in relation to having two bit registers and a two bit counter 740, any number of bits may be used for the counter 740 and the registers without departing from the scope of the present disclosure. One advantage of the configuration of the circuitry in FIG. 7 is that the initial value of the counter 740 is unimportant. Because the counter 740 counts cyclically over a range of numbers (e.g., 0, 1, 2, and 3), its initial starting point does not matter for the purpose of detecting whether collapse has occurred.

In some implementations, the detector circuit of FIG. 7 may be used to modify a phase of the fast clock signal. Because the fast clock signal may have a shorter period than the slow clock signal, modifying the phase of the fast clock provides better resolution than modification of the slow clock signal. Furthermore, when the fast clock is N times faster than the slow clock, then all registers previously discussed should have bit width of B+1 bits, where B=ceiling (log 2(N)). This ensures that sufficient fast clock edges are inspected such that at least two fast clock edges with corresponding slow clock edges are included.

Figure 8:
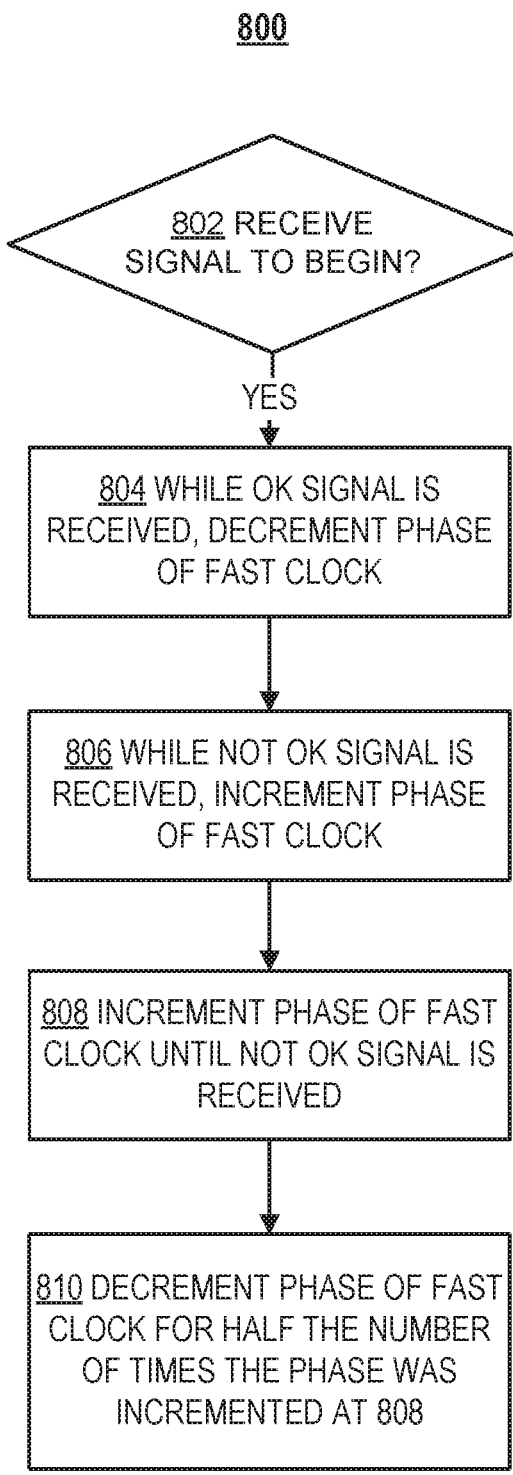
FIG. 8 shows an illustrative flow diagram of a process for adjusting a phase of a fast clock to align the fast clock with a slow clock, in accordance with an implementation.

FIG. 8 shows an illustrative flow diagram of a process 800 for adjusting a phase of the fast clock so that the fast clock is closely aligned with the slow clock. In particular, the result of the process 800 is that the fast clock and the slow clock are aligned, such that the circuit operates near the middle of the region 632 of FIG. 6.

At 802, the detector circuit receives a signal to begin. For example, a phase locked loop (PLL) is a feedback control component that automatically adjusts the phase of a locally generated signal to match the phase of an input signal. When the output signal has a phase that matches that of the input signal, the PLL may provide a lock signal to indicate a phase match.

At 804, while an OK signal is received, the phase of the fast clock is decremented. In an example, an OK signal may be received, such as the OK signal that is output from the final register 758 of FIG. 7. As described in relation to FIG. 7, the OK signal indicates that the circuit is operating in one of the regions 630, 632, and 634, where collapse has not occurred and the fast and slow clocks are aligned. As long as the OK signal is received, the phase of the fast clock may be decremented. Decrementing the phase of the fast clock may correspond to a counter-clockwise traversal of the polar diagram in FIG. 6. Thus, the result of 804 is that the circuit operates within the region 636 just to the left of the region 630.

At 806, while a NOT OK signal is received, the phase of the fast clock is incremented. In an example, the NOT OK signal corresponds to the output of the final register 758 of FIG. 7. As described in relation to FIG. 7, the NOT OK signal indicates that the circuit is operating within the region 636, where collapse has occurred and the fast and slow clocks are not aligned. As long as the NOT OK signal is received, the phase of the fast clock may be incremented. Incrementing the phase of the fast clock may correspond to a clockwise traversal of the polar diagram in FIG. 6. Thus, the result of 806 is that the circuit operates just to the right of the left edge of the region 630.

At 808, the phase of the fast clock is incremented until a NOT OK signal is received. Because incrementing the phase of the fast clock corresponds to a clockwise traversal of the polar diagram of FIG. 6, the result of 808 is that the circuit operates just to the right of the right edge of the region 634.

At 810, the phase of the fast clock is decremented for half the number of times the phase was incremented at 808. In particular, at 808, the polar diagram 600 was traversed from the left edge of the region 630 to the right edge of the region 634. Decrementing the phase of the fast clock for half the number of steps from 808 causes the circuit to operate near the middle of the region 632, where the fast and slow clocks are perfectly aligned. The result of 810 may cause an output signal to be provided that indicates phase lock and alignment have occurred.

The process 800 of FIG. 8 was described with the assumption that incrementing and decrementing of the phase of the fast clock is possible. In some implementations, it may be desirable to implement a similar process in a circuit where the phase of the fast clock may only be adjusted in a single direction (e.g., incremented or decremented, but not both). In another example, it may be desirable to implement a similar process in a circuit where the phase of the fast clock does not wrap. It will be understood that one or both of these cases may be implemented without departing from the scope of the present disclosure.

In some implementations, the delay 221 between the first stage 220 and the second stage 222 should match the delay 223 between the second stage 222 and the third stage 224. If the delays 221 and 223 did not match, then the region that provides an OK signal (e.g., the regions 630, 632, and 634) would not be centered around zero degrees, and clock loss could occur. In particular, if the clock-to-out time (TCO) is less than the hold time (TH), then the delays 221 and 223 must be greater than zero.

In some implementations, the detector circuit described in relation to FIG. 1 or 7 may span over two logic array blocks (LABs). Because the collapsible three-stage pipeline may require two different clocks (fast clock and slow clock), and each LAB may only accept one clock, the detector circuit may require at least two LABs. In one example, each LAB may include 20 available flip flops. The detector circuit described herein may require two flip flops for each bit. For B+1 bits, this means that B is at most 9. This means that the fast clock may be anywhere from 1 times the frequency of the slow clock, up to 512 times the frequency of the slow clock.

In some implementations, the detector circuit of FIG. 1 or 7, or the collapsible three-stage pipeline of FIG. 2 may be placed in a location where it is desirable for the phase difference between the clocks to be zero. For example, if the clock signals have an overlapping region, the detector may be placed in the center of the overlapping region. Otherwise, if the clock signals do not have any overlapping region, then the detector or collapsible pipeline may be placed in between the two clock regions. The other components of the circuitry are standard units and may be placed anywhere on the integrated circuit.

In some implementations, it may be desirable to align more than two clock signals. In one example, there may be a 1× clock, a 2× clock (at twice the frequency of the 1× clock), and a 4× clock (at four times the frequency of the 1× clock). A first method to align these three clocks is to perform two alignments: align the 2× clock to the 1× clock, and align the 4× clock to the 1× clock. In a second method, the 2× clock may be first aligned to the 1× clock, and then the 4× clock may be aligned to the 2× clock. The first method may be preferred over the second method because the second method may have accumulated error. In particular, the first method may have some error associated with the alignment of the 2× and the 1× clocks, and some error associated with the alignment of the 4× and the 1× clocks. However, the second method may have some error associated with the alignment of the 2× and the 1× clocks, and the same error may be accumulated with additional error during the alignment of the 4× and the 2× clocks. Accordingly, any number of clocks at any frequency may be aligned according to the systems and methods disclosed herein, by locking each clock to the 1× clock. An AND gate may be used to signal when all of the clocks are aligned.

In some implementations, the fast clock may have a frequency that is M times the frequency of the slow clock, where M is not a power of 2. In this case, then B may be equal to the ceiling of the $\log_2$ of M. In an example, if M=7, B=3. In this case, the counter 740 counts from 0 to 2M−1.

In some implementations, the fast clock and the slow clock may have frequencies that are related by a non-integer multiple. In an example, the fast clock may be denoted as an "aX" clock and the slow clock may be denoted as a "bX" clock. In this case, not every edge of the slow clock has a corresponding edge of the fast clock. To remedy this, it may be desirable to generate a third clock signal having a frequency corresponding to the least common multiple of a and b, and align each of the fast clock and the slow clock to the third clock. For example, to align a 2× clock with a 3× clock, a 6× clock may be generated and used to align to each of the 2× clock and the 3× clock.

Figure 9:
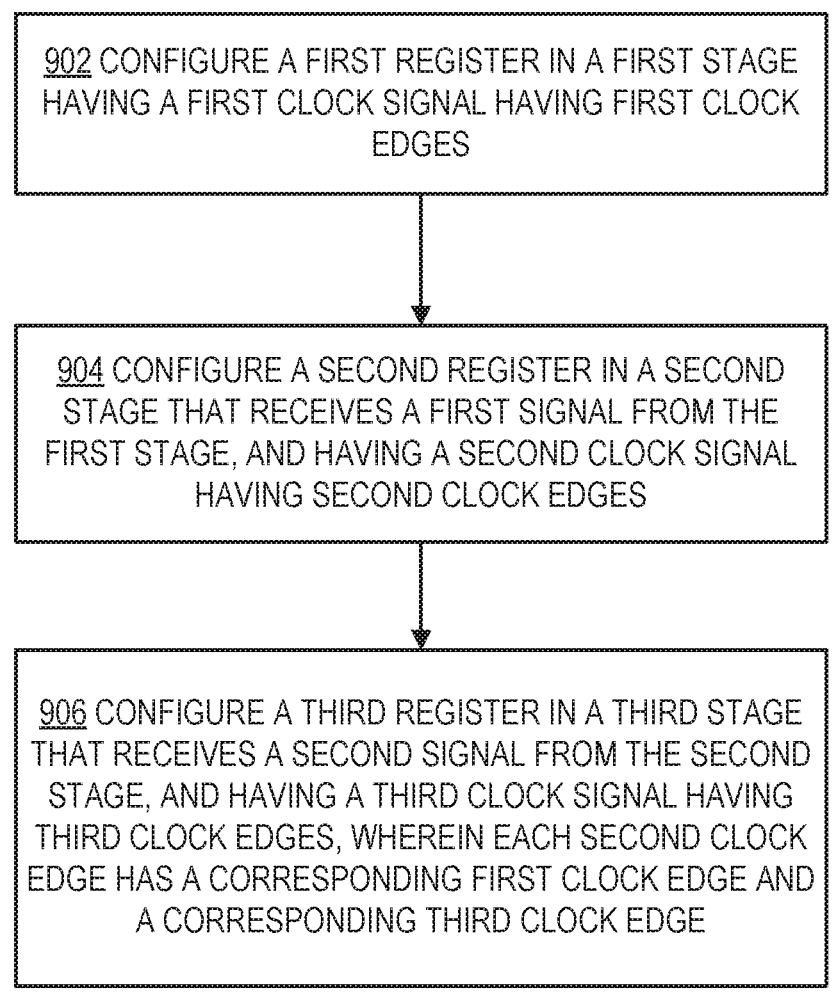
FIG. 9 shows an illustrative flow diagram of a process for configuring a phase detector for use with an FPGA, in accordance with an implementation.

FIG. 9 shows an illustrative flow diagram of a process 900 for configuring a phase detector for use with an FPGA. At 902, a first register in a first stage is configured. The first register has a first clock signal having first clock edges. At 904, a second register in a second stage is configured. The second register receives a first signal from the first stage, and has a second clock signal having second clock edges. At 906, a third register in a third stage is configured. The third register receives a second signal from the second stage, and has a third clock signal having third clock edges. Each second clock edge has a corresponding first clock edge and a corresponding third clock edge.

In some implementations, the first, second, and third stages resemble a pipeline of two stages when the first clock signal and the second clock signal are misaligned with each other. In particular, as was described in relation to FIGS. 4 and 5, when the first clock signal has a positive phase delay with respect to the second clock signal, the second stage and the third stage collapse to resemble a single stage. Moreover, when the second clock signal has a positive phase delay with respect to the first clock signal, the first stage and the second stage collapse to resemble a single stage.

In some implementations, a two-stage pipeline is configured to include a fourth register and a fifth register. The first stage, the second stage, and the third stage form a collapsible three-stage pipeline, where all the registers share a clock signal (e.g., the fast clock), except for the second stage, which uses a different clock signal (e.g., the slow clock). A counter may be configured to provide an input signal into the collapsible three-stage pipeline and the two-stage pipeline, and a comparator may be configured to compare a first output of the collapsible three-stage pipeline and a second output of the two-stage pipeline to determine whether collapse has occurred in the collapsible three-stage pipeline.

Figure 10:
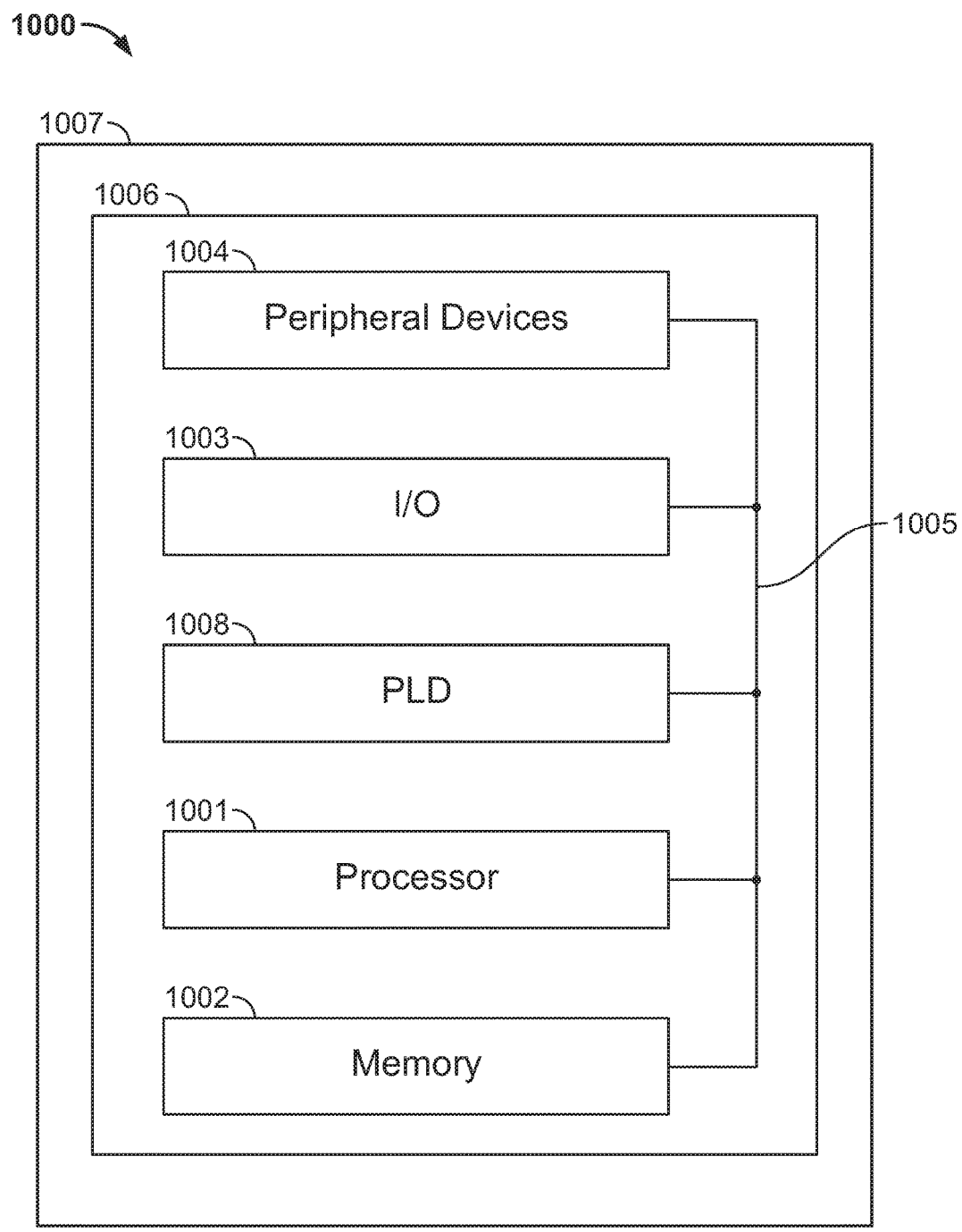
FIG. 10 shows an illustrative block diagram of an exemplary system employing a programmable logic device (PLD) incorporating the systems and methods of the present disclosure, in accordance with an implementation.

FIG. 10 is a simplified block diagram of an exemplary system employing a programmable logic device incorporating the present invention. A PLD 1008 configured to include arithmetic circuitry according to any implementation of the present invention may be used in many kinds of electronic devices. One possible use is in an exemplary data processing system 1000 shown in FIG. 10. Data processing system 1000 may include one or more of the following components: a processor 1001; memory 1002; I/O circuitry 1003; and peripheral devices 1004. These components are coupled together by a system bus 1005 and are populated on a circuit board 1006 which is contained in an end-user system 1007.

System 1000 can be used in a wide variety of applications, such as computer networking, data networking, instrumentation, video processing, digital signal processing, Remote Radio Head (RRH), or any other application where the advantage of using programmable or reprogrammable logic is desirable. PLD 1008 can be used to perform a variety of different logic functions. For example, PLD 1008 can be configured as a processor or controller that works in cooperation with processor 1001. PLD 1008 may also be used as an arbiter for arbitrating access to shared resources in system 1000. In yet another example, PLD 1008 can be configured as an interface between processor 1001 and one of the other components in system 1000. It should be noted that system 1000 is only exemplary, and that the true scope and spirit of the invention should be indicated by the following claims.

Various technologies can be used to implement PLDs 1008 as described above and incorporating this invention.

FIG. 11 presents a cross section of a magnetic data storage medium 1100 which can be encoded with a machine executable program that can be carried out by systems such as the aforementioned personal computer, or other computer or similar device. Medium 1100 can be a floppy diskette or hard disk, or magnetic tape, having a suitable substrate 1101, which may be conventional, and a suitable coating 1102, which may be conventional, on one or both sides, containing magnetic domains (not visible) whose polarity or orientation can be altered magnetically. Except in the case where it is magnetic tape, medium 1100 may also have an opening (not shown) for receiving the spindle of a disk drive or other data storage device.

The magnetic domains of coating 1102 of medium 1100 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 12 shows a cross section of an optically-readable data storage medium 1210 which also can be encoded with such a machine-executable program, which can be carried out by systems such as the aforementioned personal computer, or other computer or similar device. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

The above use of the term "FPGA" is exemplary, and should be taken to include various types of integrated circuits, including but not limited to commercial FPGA devices, complex programmable logic device (CPLD) devices, configurable application-specific integrated circuit (ASSP) devices, configurable digital signal processing (DSP) and graphics processing unit (GPU) devices, hybrid application-specific integrated circuit (ASIC), programmable devices or devices which are described as ASICs with programmable logic cores or programmable logic devices with embedded ASIC or ASSP cores.

It will be apparent to one of ordinary skill in the art, based on the disclosure and teachings herein, that aspects of the disclosed techniques, as described above, may be implemented in many different forms of software, firmware, and hardware in the implementations illustrated in the figures. The actual software code or specialized hardware used to implement aspects consistent with the principles of the disclosed techniques are not limiting. Thus, the operation and behavior of the aspects of the disclosed techniques were described without reference to the specific software code—it being understood that one of ordinary skill in the art would be able to design software and hardware to implement the aspects based on the description herein.

What is claimed is:

1. A phase correction system, comprising:
a phase detector, comprising:
a collapsible pipeline;
a non-collapsible pipeline; and
alignment detection logic that determines whether a first clock signal of a first clock is aligned with a second clock signal of a second clock, based at least in part upon a comparison between a first output of the collapsible pipeline with a second output of the non-collapsible pipeline, wherein: the phase detector provides an indication signal that indicates whether or not the first clock signal is aligned with the second clock signal.

2. The phase correction system of claim 1, wherein: the alignment detection logic determines, via the comparison, whether the collapsible pipeline has collapsed to resemble fewer than a possible number of stages available in the collapsible pipeline.

3. The phase correction system of claim 1, wherein: the phase detector provides an indication, via the indication signal, that the first clock signal is aligned with the second clock signal, when the first output and the second output are not equal.

4. The phase correction system of claim 1, wherein: the phase detector provides an indication, via the indication signal, that the first clock signal is not aligned with the second clock signal, when the first output and the second output are equal.

5. The phase correction system of claim 1, further comprising an input register that feeds a common input signal to both the collapsible pipeline and the non-collapsible pipeline.

6. The phase correction system of claim 5, further comprising a counter that provides a count sequence of a plurality of counts as inputs to the input register.

7. The phase correction system of claim 6, wherein the alignment detection logic comprises:
a comparator that provides a plurality of comparison outputs by performing the comparison of the first output and the second output, for each of the plurality of counts;
an accumulator that calculates an accumulation of the plurality of comparison outputs; and
an output register that stores an indication of whether the first clock is aligned with the second clock, based at least in part upon the accumulation of the plurality of comparison outputs.

8. The phase correction system of claim 1, wherein the collapsible pipeline comprises: at least a first register and a second register that latch upon a rising edge of a clock signal of the first clock; at least one intermediate register between the first register and the second register that latches upon a rising edge of a clock signal of the second clock.

9. The phase correction system of claim 8, wherein the non-collapsible pipeline comprises: at least two registers that latch upon a rising edge of the clock signal of the first clock.

10. The phase correction system of claim 1, further comprising: phase correction logic that adjusts a phase of the first clock to align with the second clock.

11. The phase correction system of claim 10, wherein the phase correction logic: decrements a phase of the first clock while an indication indicates that the first clock is aligned with the second clock;
increments the phase of the first clock when the indication subsequently transitions from indicating that the first clock is aligned with the second clock to indicating that the first clock is not aligned with the second clock;
decrements the phase of the first clock by half an amount of the increments of the phase performed before the transition back to indicating that the first clock cycle is not aligned with the second clock when the indication subsequently transitions back to indicating that the first clock is not aligned with the second clock.

12. A method, comprising:
receiving a plurality of indications from a phase detector of an integrated circuit, the plurality of indications indicating whether or not a first clock signal provided by a first clock of the integrated circuit is tolerably aligned with a second clock signal provided by a second clock of the integrated circuit; and
based upon the plurality of indications, adjusting a phase of the first clock signal, such that the first clock signal and the second clock signal are aligned;
wherein the phase detector provides the plurality of indications based upon an accumulation of a plurality of comparisons of first outputs of a collapsible pipeline and second outputs of a non-collapsible pipeline.

13. The method of claim 12, comprising adjusting the phase, by: first, upon the plurality of indications indicating that the first clock signal is tolerably aligned with the second clock signal, decrementing the phase of the first clock signal a first amount until the plurality of indications indicate that the first clock signal is not tolerably aligned with the second clock signal;
second, upon the plurality of indications indicating that the first clock signal is not tolerably aligned with the second clock signal, incrementing the phase of the fast first clock a second amount, such that plurality of indications return to indicating that the first clock signal is tolerably aligned with the second clock signal, until the plurality of indications once again indicate that the first clock signal is not tolerably aligned with the second clock signal; and
third, decrement the phase of the first clock signal by half of the second amount.

14. The method of claim 12, wherein: the collapsible pipeline comprises a three stage collapsible pipeline having three pipelined registers, wherein a middle register of the three pipelined registers latches based upon a rising edge of the second clock signal and an others of the three pipelined registers latch based upon a rising edge of the first clock signal; and the non-collapsible pipeline comprises a two stage pipeline having two registers that latch based upon the rising edge of the first clock signal.

15. A programmable logic device, comprising:

a first clock that provides a first clock signal;

a second clock that provides a second clock signal; and phase detection and correction logic that provides an indication of whether or not the first clock signal is aligned with the second clock signal and corrects misalignment between the first clock signal and the second clock signal prior to processing input data provided to the programmable logic device;

wherein each edge of the first clock signal corresponds to an edge of the second clock signal; and wherein the phase detection and correction logic corrects misalignment caused by static properties of the programmable logic device, variable distances that the first clock signal, the second clock signal or both travel, or the static properties of the programmable logic device, the variable distances that the first clock signal, the second clock signal or both travel.

16. The programmable logic device of claim 15, wherein the phase detection and correction logic comprises:

a collapsible pipeline;

a non-collapsible pipeline;

an input register that feeds a common input to both the collapsible pipeline and the non-collapsible pipeline; and a comparator that compares an output from the collapsible pipeline and a second output from the non-collapsible pipeline;

indication logic that provides the indication, wherein:

the indication indicates that the first clock signal and the second clock signal are not aligned when the first output and the second output are the same; and the indication indicates that the first clock signal and the second clock signal are aligned when the first output and the second output are not the same.

17. The programmable logic device of claim 16, wherein:

the phase detection and correction logic comprises:

a cycle counter that feeds a sequence of counts to the input register;

an accumulator that accumulates a comparison output from the comparator for the sequence of counts;

an alignment status register that stores the indication after the sequence of counts is provided to the input register; and logic that adjusts a phase of the first clock signal based upon a plurality of indications obtained from the alignment status register.

\* \* \* \* \*